United States Patent

Udert et al.

Patent Number: 5,468,176
Date of Patent: Nov. 21, 1995

[54] DISK-SHAPED TOOL BIT FOR AN ANGLE GRINDER

[75] Inventors: Karl E. Udert, Triesen, Liechtenstein; Walter Winkler, Gams, Switzerland

[73] Assignee: Hilti Aktiengesellschaft, Fürstentum, Liechtenstein

[21] Appl. No.: 146,894

[22] Filed: Nov. 1, 1993

[30] Foreign Application Priority Data

Nov. 2, 1992 [DE] Germany ............ 42 36 964.9

[51] Int. Cl.⁶ .................................... B24B 23/00
[52] U.S. Cl. .................... 451/359; 451/353; 451/358; 451/342; 451/541; 451/548
[58] Field of Search ................ 51/32, 54, 72 R, 51/77 R, 109 R, 177, 180, 209 R, 209 DL:170 PT, 170 T; 451/342, 353, 359, 358, 541, 548

[56] References Cited

U.S. PATENT DOCUMENTS

| | | | |
|---|---|---|---|
| 1,240,428 | 9/1917 | Duzey | 51/170 PT |
| 2,216,989 | 10/1940 | Clair | 51/170 PT |
| 3,594,958 | 7/1971 | Cusumano | 51/170 PT |
| 4,782,632 | 11/1988 | Matechuk | 51/170 T |
| 5,186,462 | 2/1993 | Lin | 51/170 T |

*Primary Examiner*—Bruce M. Kisliuk
*Assistant Examiner*—Eileen P. Morgan
*Attorney, Agent, or Firm*—Anderson Kill Olick & Oshinsky

[57] ABSTRACT

A disk-shaped tool bit (8) of an angle grinder has an annular disk-shaped carrier member covered on its radially outer circumferentially extending surface and on its side face surfaces with abrasive grains. A central through opening extending between the side face surfaces (8a, 8b) serves for attaching the tool bit to the angle grinder. The central through opening has a surface extending between the side face surfaces and tapering inwardly from each side face surface toward the axis of the central opening. The inwardly tapering surfaces form engagement surfaces (8c, 8d), at which an attachment element (11) of a receiving device (7) of the angle grinder bears for securing the tool bit in place. The attachment element (11) does not project outwardly from the side face surface (8b) facing outwardly from the angle grinder.

5 Claims, 3 Drawing Sheets

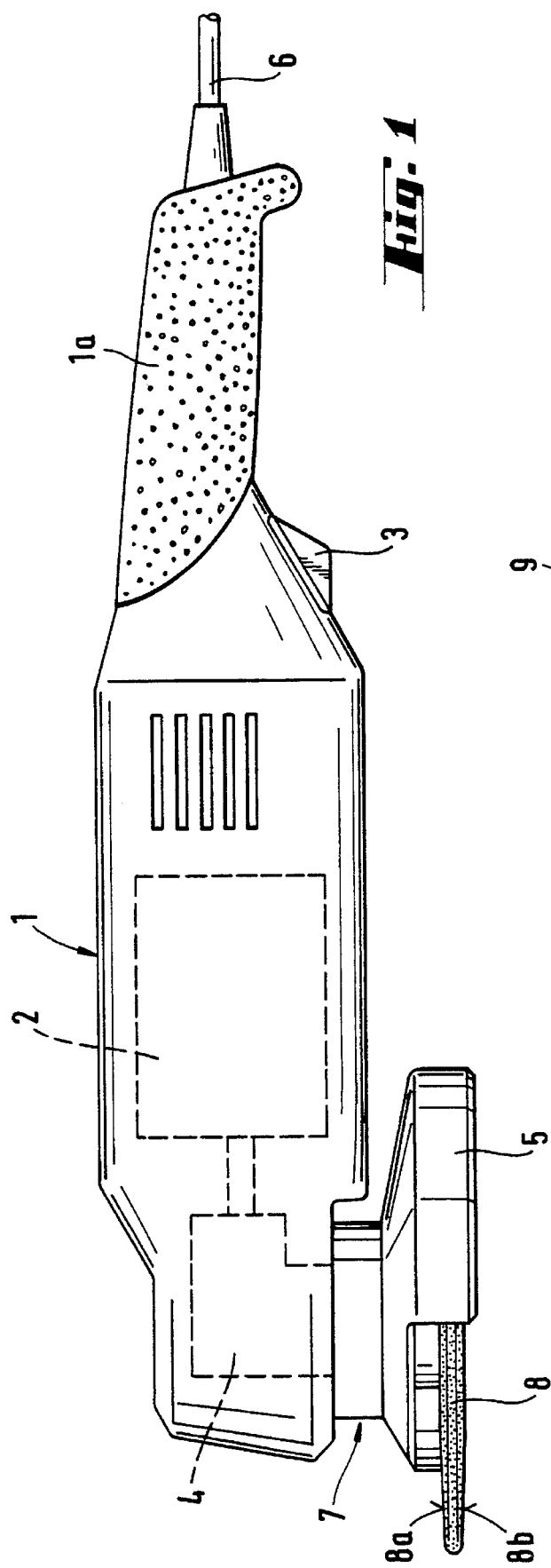
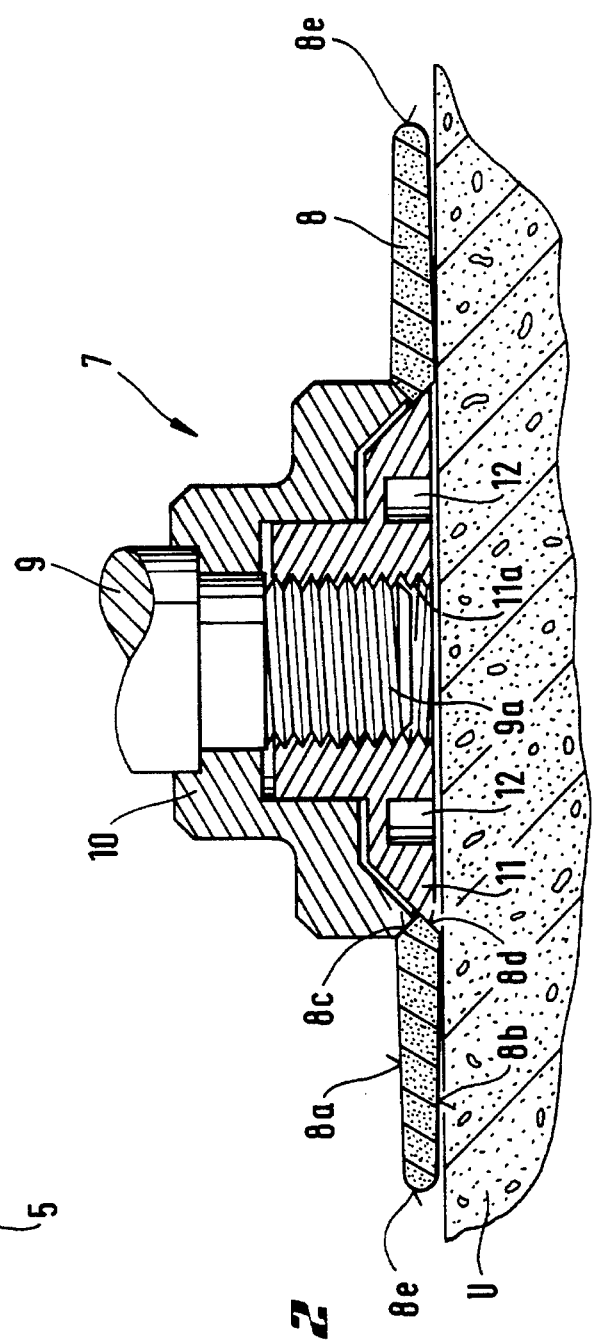

DISK-SHAPED TOOL BIT FOR AN ANGLE GRINDER

BACKGROUND OF THE INVENTION

The present invention is directed to a disk-shaped tool bit for a manually operated power tool with an annular disk-shaped carrier member covered with abrasive grains at an outer circumferentially extending peripheral surface and at least partially in the region adjoining the peripheral surface. Further, the carrier member has a central through opening.

Disk-shaped tools or tool bits covered with abrasive grains are used to form grooves or notches and also to machine surfaces as well as to cut or mill parts formed of hard material, such as concrete, rock and the like.

A diamond cutting disk is disclosed in DE-OS 35 13 687 and includes an annular disk-shaped carrier member with a through opening and is covered with diamond grains at the outer circumferential periphery as well as on the side faces. The through opening extends perpendicularly to the side faces of the carrier member.

The attachment of such a diamond cutting disk to a manually operated power tool is achieved by a flange positioned on the drive spindle of the power tool and an attachment member with the diamond cutting disk located between them. Although the known diamond cutting disk is partially covered with diamond grains on the side faces, no machining of the surface to be worked on can be performed. At least a portion of the attachment member projects outwardly from the side face or surface of the diamond cutting disk facing away from the power tool and, thus, the attachment member bears against or contacts the surface to be worked on.

A power tool with flexural contact members for milling or shadow joints is known from DE-OS 32 39 986. The circular saw member disclosed in this patent publication is pot-shaped and, as a result, an attachment nut for securing the circular saw member to the power tool can be placed flush with the surface of one side face of the circular saw member.

If the side face surfaces of such a circular saw member were to be covered with abrasive grains, surface machining could be effected. The usability of both sides, desired for reasons of wear, however, would not be possible due to the pot-shaped design whereby in such a device considerable disadvantages would arise.

SUMMARY OF THE INVENTION

Therefore, the primary object of the present invention is to provide a disk-shaped tool or tool bit so that surface grinding or working is made possible not only with the circumferentially extending peripheral surface but also with both side face surfaces.

In accordance with the present invention, the central through opening of the tool or tool bit tapers inwardly from the side facing towards a mid-plane of the carrier member where the mid-plane is perpendicular to the axis of the through opening.

Due to the inwardly tapering surfaces defining the through opening, engagement surfaces are formed for contacting an attachment element which fastens the disk-shaped tool so that it is positioned flush with the surface of one of the side face surfaces of the carrier member. Accordingly, this side face surface can perform surface grinding of the surface to be worked on with the attachment element bearing on the tapering surface of the through opening.

Such an attachment member can be an attachment nut, screw or expansion sleeve with a clamping surface or face matched to the engagement surfaces or faces of the disk-shaped tool or tool bit. When the attachment element is secured in place there is the additional feature of radial centering of the disk-shaped tool or tool bit with respect to the receiving device of a power tool.

Preferably, the tapering surfaces of the through opening are symmetrical. With such a symmetrical design of the tapering surfaces, the attachment element can seat against both of the engagement faces.

Preferably, the surfaces of the through openings have a conical shape. Conically shaped surfaces can be easily and inexpensively formed with appropriate tools.

To transmit a torque in the region of the two openings of the disk-shaped tool bit, the through opening is expediently provided with a profiled surface in its tapering surfaces. The tapering surfaces are formed by symmetrically disposed entrainment faces oriented essentially in a beam-shaped manner towards the central axis with the entrainment surfaces formed as flanks of a toothed surface.

Several disk-shaped tool bits in accordance with the invention could be positioned next to one another in a suitable receiving device with appropriate spacer elements, such as intermediate rings, arranged between the tool bits, with the rings having surfaces matched to the engagement surfaces of the disk-shaped tool bit. As a result, the power tool can be used not only for grinding or cutting but also for milling, if it should be necessary to mill grooves into a masonry surface. A disk-shaped tool bit in combination with a manually operated power tool is preferably used so that an attachment element forming a part of the power tool cooperates by means of cone-shaped clamping surfaces with the through opening whereby it does not project outwardly from the outwardly directed side face of the disk-shaped tool bit.

The disk-shaped tool bit in accordance with the present invention can be used in various manually operated power tools. Such a power tool can be an angle grinder used especially for grinding or cutting as well as for milling in masonry, concrete, reinforced concrete and the like. Power tools can also be used which supply a swinging or oscillating rotating grinding motion to the disk-shaped tool bit. As a rule, only a single disk-shaped tool bit is used on an angle grinder for cutting and grinding work. For milling work, however, several disks can be arranged next to one another depending on the width of the opening to be cut in the surface being worked on. Based on the type of material of the surface being worked on, the disk-shaped tool bits or tools can be connected to form a set of disks with the disks close to one another or spaced further apart. Appropriate spacer elements are positioned between the individual disk-shaped tool bits. The individual disks can be clamped together and fixed to the angle grinder by means of an attachment element cooperating with the drive shaft of the angle grinder. The attachment member in such an arrangement has its side surface or face directed away from the angle grinder flush with the face or surface of the disk-shaped tool located most remote from the angle grinder.

For transmitting torque generated by the power tool in an improved manner through the attachment element to the annular disk-shaped carrier member, the conically-shaped clamping surfaces are provided as a profiled surface. The profiled surface can be shaped in a tooth-like manner with the flanks of the teeth forming entrainment faces directed essentially in a beam-shaped manner towards the center of the carrier member.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 1 is a side elevational view of an angle grinder with a disk-shaped tool bit embodying the present invention;

FIG. 2 is an enlarged sectional view of a receiving device mounting the disk-shaped tool bit illustrated in FIG. 1;

DETAILED DESCRIPTION OF THE INVENTION

Figure 3:
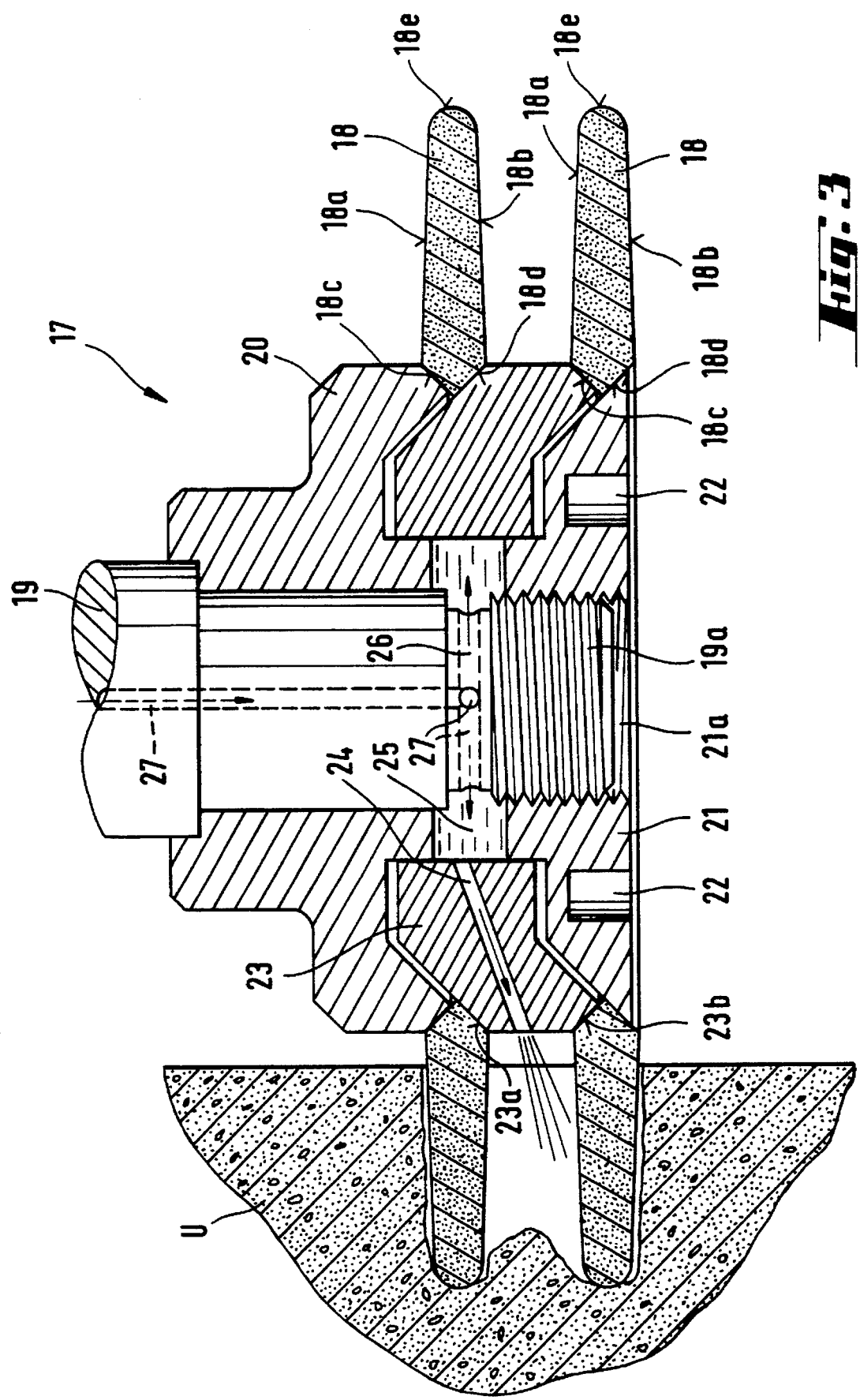
FIG. 3 is an enlarged sectional view of another receiving device mounting two disk-shaped tool bits.

In FIG. 1, the manually operated power tool is an angle grinder. The power tool includes a housing 1, a handle 1a at one end, a drive motor 2 located in the housing, an actuation switch 3, an angular gear drive 4 shown in dash lines, a protective hood 5, an electrical cable 6 connecting the angle grinder to an external source of current, and a receiving device 7 for mounting a disk-shaped tool bit 8 on the power tool.

FIG. 2 is an enlarged sectional view of the receiving device 7 mounting a disk-shaped tool bit 8 for effecting surface machining on the structure U. Receiving device 7 is seated on a drive spindle 9 of an angle or miter gear 4 driven by drive motor 2 with the receiving device projecting at least partially axially out of the front or left-hand end of the housing 1. The receiving device 7 has a flange-like element 10 and an attachment member 11 with an internal thread 11a engageable with an external thread 9a on the drive spindle 9. Attachment member 11 has two blind bores diametrically opposite one another for receiving the pins of a pin-type wrench, not shown. The pin-type wrench tightens the attachment member 11 onto the drive spindle 9.

Disk-shaped tool bit 8 is formed of an annular disk-shaped carrier member covered with abrasive grains on its radially outer circumferentially extending peripheral surface 8e and also on the side face surfaces 8a, 8b. In addition, the tool bit has a central through opening. The carrier member has a surface defining the central through opening so that it can be fixed to the receiving device 7 on both the radially inner parts of the side face surfaces 8a, 8b. Accordingly, the surface defining the through opening in the carrier member tapers inwardly from the side face surfaces 8a, 8b towards the axial center of the opening. The central through opening has conically-shaped surfaces 8c, 8d symmetrical to one another. The conically-shaped surfaces 8c, 8d intersect at a mid-plane of the carrier member extending perpendicularly of the axis of the opening. Accordingly, the disk-shaped tool bit 8 is suitable for cutting, grinding and milling hard materials. The machining or working of such materials can be performed in a wet or dry manner.

FIG. 3 is an enlarged view of a receiving device 17 for mounting two disk-shaped tool bits 18 in spaced relation next to one another while cutting a slot-like recess in a structure U shown as a concrete structure. The disk-shaped tool bits 18 are annular disk-shaped carrier members covered with diamond grains on their radially outer circumferentially extending peripheral surface 18e as well as on the side face surfaces 18a, 18b. Receiving device 17 is fitted on the drive spindle 19 of an angle grinder. The receiving device includes a flange-like element 20 and an attachment element 21. Attachment element 21 has an internal thread 21a engageable with an external thread 19a on the drive spindle 19. In addition, blind bores 22 located diametrically opposite one another are formed in the attachment element 21 and are arranged to receive pins of a pin-type wrench, not shown.

In addition, the receiving device includes an annular spacer element 23, such as an intermediate ring, located between the disk-shaped tool bits 18. The annular disk-shaped carrier members of the disk-shaped tool bits 18 have surfaces defining the through opening with the surfaces tapering inwardly towards the center of the opening. The surfaces of the through opening are conically-shaped surfaces 18c, 18d formed symmetrically relative to one another spacer element 23 has stop faces or clamping faces 23a, 23b at its radially outer ends which are also conically-shaped and cooperate with the conically-shaped surfaces of the through openings of the carrier members. When machining the slot-like recesses, part of the structure U remains between the disk-shaped tool bits 18, however, such parts can be removed by a suitable tool after the recess has been formed.

To reduce the generation of dust and the wear of the disk-like tool bits 18 when the slot-like recesses are formed in the structure U, the receiving device 17 is equipped with water supply means. The water supply means include a supply channel 27 extending centrally through the drive spindle 19 and terminating above the thread 19a and opening into a circumferentially extending groove 26 in the drive spindle 19. The water supplied through the supply channel 27 discharges into the machining region through an appropriate connection channel 24 in the spacer element 23. The flange-like element 20 and the attachment element 21 cooperate with the spacer element by means of circumferentially extending projections or shoulders. A circumferentially extending cavity 25 is formed between the facing surfaces of the shoulders and is located in the discharge region of the supply channel 27 and the inlet to the connection channel 24.

Figure 4:
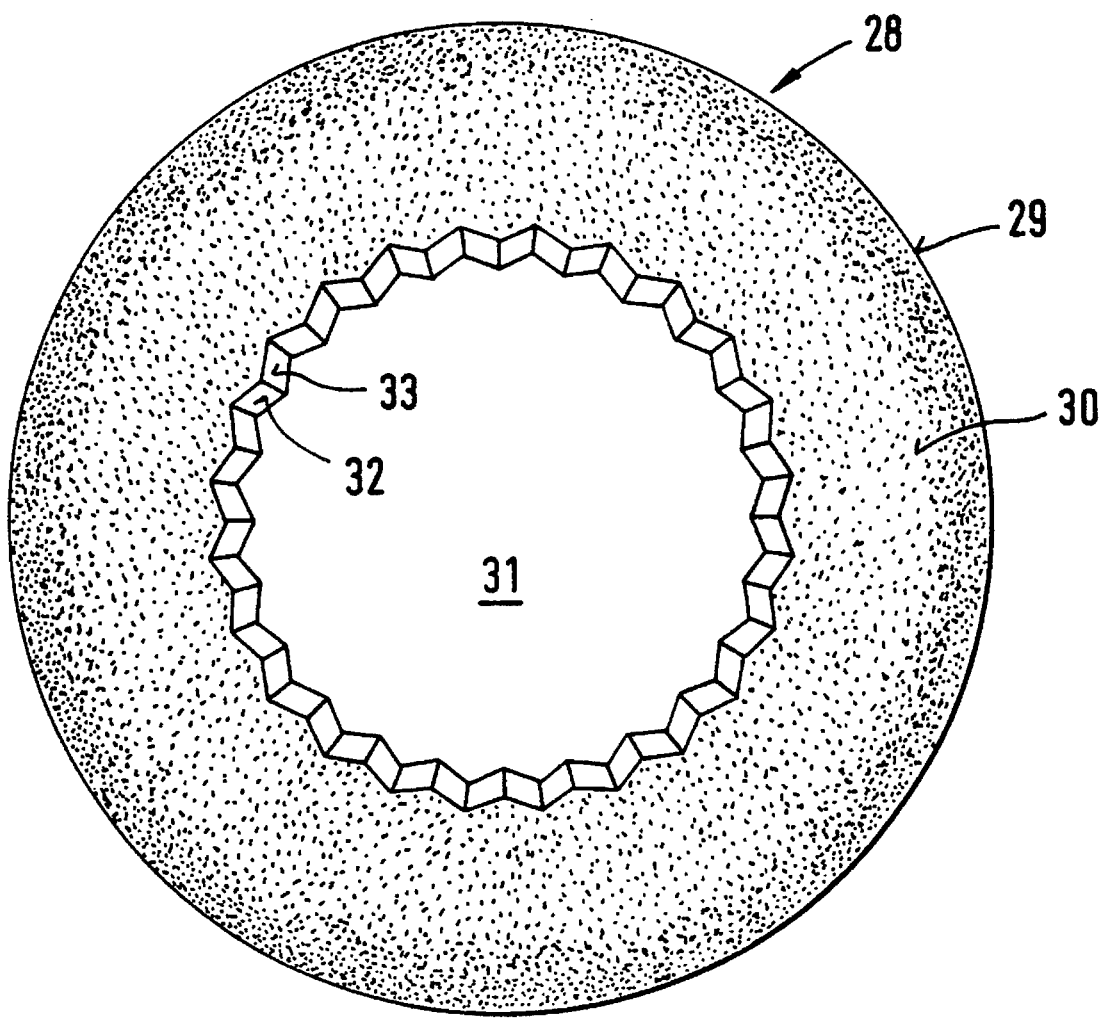
FIG. 4 is a plan view of another embodiment of the disk-shaped tool bit.

FIG. 4 illustrates another disk-shaped tool bit 28 including an annular disk-shaped carrier member covered with abrasive grains on its radially outer circumferentially extending peripheral surface 29 and also on it side face surfaces 30. The carrier member has a central through opening 31. The surface of the carrier member defining the central through opening 31 tapers conically inwardly from the side face surfaces 30 to a mid-plane of the carrier member extending perpendicularly to the axis of the through opening 31. The tapered surfaces defining the through opening are provided with a profiled surface in the shape of a toothed profile. The individual flanks 32, 33 of the toothed profile are arranged at an angle to the circumferential direction while forming entrainment faces in the circumferential direction.

While specific embodiments of the invention have been shown and described in detail to illustrate the inventive principles, it will be understood that the invention may be embodied otherwise without departing from such principles.

We claim:

1. A disk-shaped tool bit for a manually operated power tool comprises an annular disk-shaped carrier member having a central axis of rotation, a radially outer circumferentially extending peripheral surface extending generally in the axial direction and a pair of oppositely facing side face surfaces extending generally radially inwardly from said peripheral surface transversely of the axial direction, and a central through opening extending between said side face surfaces, said peripheral surface and at least a part of each of said side surfaces adjacent said peripheral surface are covered with abrasive grains, wherein the improvement comprises that a first surface extending transversely of said side face surfaces defines said central through opening, said central through opening has a mid-plane located between said side face surfaces and extending perpendicularly to the central axis of rotation, and said first surface comprises a pair of second surfaces each tapering inwardly toward the axis of rotation from a different one of said side face surfaces.

2. A disk-shaped tool bit, as set forth in claim 1, wherein said second surfaces taper symmetrically to said mid-plane.

3. A disk-shaped tool bit, as set forth in claims 1 or 2, wherein said second surfaces of said central through opening are conically-shaped.

4. A disk-shaped tool bit, as set forth in claim 3, wherein said first surface has a profiled configuration.

5. A manually operated power tool comprising a disk-shaped tool bit, said tool bit comprising an annular disk-shaped carrier member having a central axis of rotation, a radially outer circumferentially extending peripheral surface extending generally in the axial direction, and a pair of oppositely facing side face surfaces extending radially inwardly from said peripheral surface transversely of the axial direction, and a central opening extending axially between said side face surfaces, said peripheral surface and at least a part of said side face surfaces adjacent said peripheral surface are covered with abrasive grains, wherein the improvement comprises a generally axially extending first surface defining said central through opening, said central through opening has a mid-plane extending perpendicular to the central axis of rotation, said first surface comprises a pair of second surfaces each tapering inwardly towards the axis of rotation from a different one of said side surfaces, an attachment shaped to cooperate with one of the tapering said second surfaces of said central through opening for securing said tool bit on said power tool whereby said attachment does not project axially outwardly from said side face surface of facing outwardly from said power tool.

\* \* \* \* \*